United States Patent
Khoshkava et al.

(10) Patent No.: US 10,444,838 B2
(45) Date of Patent: Oct. 15, 2019

(54) THERMALLY ACTIVATED HAPTIC OUTPUT DEVICE

(71) Applicant: IMMERSION CORPORATION, San Jose, CA (US)

(72) Inventors: Vahid Khoshkava, Montreal (CA); Mansoor Alghooneh, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 31 days.

(21) Appl. No.: 15/156,910

(22) Filed: May 17, 2016

(65) Prior Publication Data

US 2017/0336869 A1    Nov. 23, 2017

(51) Int. Cl.
  *G06F 3/01* (2006.01)
  *A63F 13/24* (2014.01)
  (Continued)

(52) U.S. Cl.
  CPC .............. *G06F 3/016* (2013.01); *A63F 13/24* (2014.09); *A63F 13/285* (2014.09);
  (Continued)

(58) Field of Classification Search
  CPC ........ G06F 3/016; G06F 3/011; G06F 3/0416; G06F 3/014; G06F 3/041; G06F 3/04847; G06F 3/16; G06F 1/163; G06F 2203/013; G06F 2203/0381; G06F 9/445; G06F 1/1626; G06F 1/1643; G06F 1/1684; G09B 21/004; Y10T 428/24446; Y10T 156/1039; Y10T 428/24942; B29C 59/02; B29C 59/18; B44C 1/005; B44C 1/00; Y10S 901/34; A61F 2210/0014; A61F 2/1635; B60H 1/00871; B60H 1/3414;
  (Continued)

(56) References Cited

U.S. PATENT DOCUMENTS 6,877,986 B2 *  4/2005  Fournier .............. G09B 21/004
                                                434/112
2009/0047197 A1 *  2/2009  Browne ................. F16D 28/00
                                                422/307

(Continued)

FOREIGN PATENT DOCUMENTS

EP   2876528 A1   5/2015
EP   2955609 A1  12/2015
GB   2420236 A    5/2006

OTHER PUBLICATIONS

Investigation and Application of an Advanced Dual Piezoelectric Cooling Jet to a Typical Electronics Cooling Configuration; 13th IEEE ITHERM Conference; Published May 30-Jun. 1, 2012; Author: Peter De Bock et al.*

(Continued)

*Primary Examiner* — Sardis F Azongha

(74) *Attorney, Agent, or Firm* — Medler Ferro Woodhouse & Mills PLLC

(57) ABSTRACT

A haptic output device is configured to generate a deformation-based haptic effect and a vibration-based haptic effect. The haptic output device includes a shape memory material configured to change a shape thereof when heated and generate the deformation-based haptic effect, and a cooling device configured to cool the shape memory material and generate the vibration-based haptic effect.

11 Claims, 7 Drawing Sheets

(51) Int. Cl.
*A63F 13/285* (2014.01)
*G06F 1/16* (2006.01)
*G06F 3/041* (2006.01)

(52) U.S. Cl.
CPC .......... *G06F 1/1626* (2013.01); *G06F 1/1643* (2013.01); *G06F 1/1684* (2013.01); *G06F 3/041* (2013.01); *G06F 2203/015* (2013.01)

(58) Field of Classification Search
CPC ........... B60H 1/3421; B60H 2001/3471; E05F 15/42; E05Y 2201/43; E05Y 2400/53; E05Y 2400/81; E05Y 2800/67; G02C 2202/22; A63F 13/25; A63F 2300/1037; B60W 50/16; F16D 2069/004; F16D 2069/005; F16D 69/00; H01H 1/0036; H01H 2061/006; H01H 37/323; H01H 61/0107
See application file for complete search history.

(56) References Cited

U.S. PATENT DOCUMENTS

| | | | |
|---|---|---|---|
| 2012/0212442 A1* | 8/2012 | Uchida | G06F 3/016 345/173 |
| 2012/0268412 A1* | 10/2012 | Cruz-Hernandez | G06F 3/0488 345/174 |
| 2013/0154984 A1* | 6/2013 | Gondo | G06F 3/016 345/173 |
| 2014/0049970 A1* | 2/2014 | de Bock | H01L 41/0926 362/373 |
| 2015/0041104 A1* | 2/2015 | De Bock | H05K 7/20172 165/104.34 |
| 2015/0145657 A1* | 5/2015 | Levesque | G06F 3/016 340/407.2 |
| 2015/0337828 A1* | 11/2015 | Refai-Ahmed | H01L 23/467 417/45 |

OTHER PUBLICATIONS

De Bock, P., et al., "Evaluation and Opportunities for Use of Thin Form Factor Synthetic Jets to Low Profile Electronics Cooling Applications," Electronics Cooling, Dec. 18, 2012; <http://www.electronics-cooling.com/2012/12/evaluation-and-opportunities-for-use-of-thin-form-factor-synthetic-jets-to-low-profile-electronics-cooling-applications-2/>.
Extended European Search Report issued in European Patent Application No. 17171433, 9 pages.

\* cited by examiner

THERMALLY ACTIVATED HAPTIC OUTPUT DEVICE

FIELD

The present invention is related to a thermally activated haptic output device configured to generate haptic effects to a user of the device.

BACKGROUND

Actuators that include shape memory materials, such as shape memory alloys (SMAs) and shape memory polymers (SMPs), are generally light weight devices that can quickly expand or contract and generate significant forces when heated. Also, they can be programmed in any shapes and when heated they can generate large amount of force. In order for such actuators to return to their original positions by contraction, the SMAs/SMPs should be cooled, which may limit their use in certain applications. Some implementations of SMAs/SMPs in actuators use return springs, for example, to physically return the actuators to their original positions, but the use of return springs may increase the energy consumption of such actuators by at least 100% and do not improve the bandwidths of the actuators above 1 Hz. Although some actuators with SMAs or SMPs have been designed with attempts to improve natural convection to cool the SMAs/SMPs so that they return to their original positions, such designs are not very efficient, are relatively bulky, and have complicated designs.

SUMMARY

It is desirable to have a haptic output device that includes a thermally activated SMA and/or SMP with improved performance.

According to an aspect of the invention, there is provided a haptic output device configured to generate a deformation-based haptic effect and a vibration-based haptic effect. The haptic output device includes a shape memory material configured to change a shape thereof when heated and generate the deformation-based haptic effect, and a cooling device configured to cool the shape memory material and generate the vibration-based haptic effect.

In an embodiment, the shape memory material includes a shape memory alloy.

In an embodiment, the shape memory material includes a shape memory polymer.

In an embodiment, the cooling device includes a frame, a first piezoelectric actuator supported by the frame, and a second piezoelectric actuator supported by the frame, and spaced from and in parallel relation to the first piezoelectric actuator. The frame, the first piezoelectric actuator, and the second piezoelectric actuator define a volume, and the frame includes at least one opening configured to allow gas to flow out of the volume toward the shape memory material to cool the shape memory material.

According to an aspect of the invention, there is provided a system that includes a sensor configured to sense an input of a user of the system, and a haptic output device configured to generate a deformation-based haptic effect and a vibration-based haptic effect based on the input sensed by the sensor. The haptic output device includes a shape memory material configured to change a shape thereof when heated and generate the deformation-based haptic effect, and a cooling device configured to cool the shape memory material and generate the vibration-based haptic effect.

In an embodiment, the system includes a controller configured to receive a first signal from the sensor, determine an overall haptic effect to be generated based on the first signal, and output a second signal to the haptic output device to generate the deformation-based haptic effect and the vibration-based haptic effect.

According to an aspect of the invention, there is provided a method for providing an overall haptic effect. The method includes heating a shape memory material to generate a deformation-based haptic effect, and cooling the shape memory material and generating a vibration-based haptic effect with a cooling device.

In an embodiment, the method includes sensing an input by a user of a system with a sensor. The system includes the sensor and a haptic output device. The method includes determining the overall haptic effect to be generated based on a first signal output by the sensor, and outputting a second signal to the haptic output device to generate the deformation-based haptic effect and the vibration-based haptic effect.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

DETAILED DESCRIPTION

Figure 1:
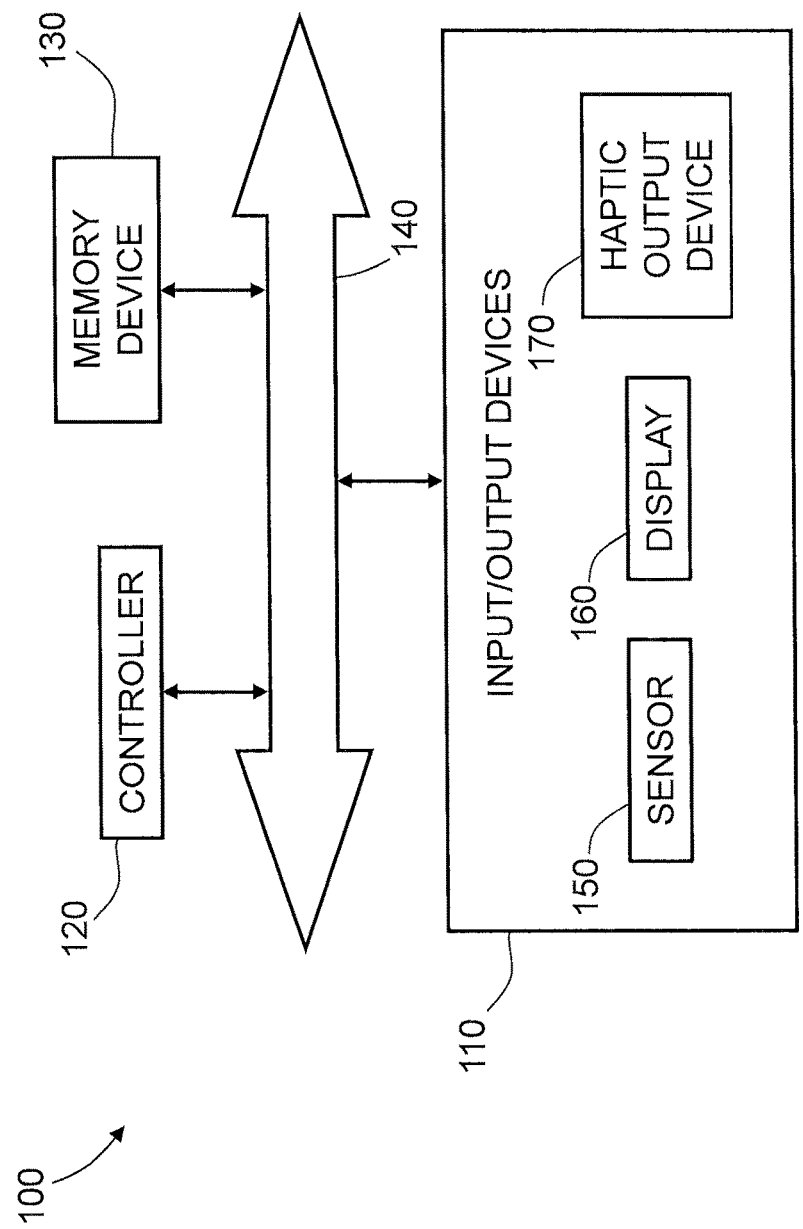
FIG. 1 schematically illustrates a system in accordance with embodiments of the invention.

FIG. 1 illustrates a system 100 in accordance with an embodiment of the invention. The system 100 may include or be part of any electronic device, such as a desktop computer, laptop computer, electronic workbook, electronic handheld device (such as a mobile phone, smartphone, gaming device, personal digital assistant ("PDA"), portable e-mail device, portable Internet access device, calculator, etc.), kiosk (such as an automated teller machine, ticket purchasing machine, etc.), printer, point-of-sale device, game controller, wearable device, or other electronic device, such as an electronic device that is part of a vehicle, such as a touch screen, touch pad, or button panel.

As illustrated, the system 100 includes input/output devices 110, a controller 120, and a memory device 130. The input/output devices 110 may be interconnected to the controller 120 and/or the memory device 130 via a bus 140 such that the input/output devices 110 are in signal communication with the controller 120. The bus 140 may include wired communication links, wireless communication links, and/or other communication links between the controller 120 and the input/output devices 110. Signals may be output by the input/output devices 110 to the controller 120 and signals may be output by the controller 120 to the input/output devices 110.

The input/output devices 110 may include at least one user input device configured to receive an input from the user of the system 100. In an embodiment, the user input device may include a sensor 150 configured to sense an input from the user. The sensor 150 may be in the form of a touch sensor and configured to detect gestures from the user, such as tapping, sliding, rubbing, or pressing a surface of the sensor 150. Several technologies may be used for this purpose, such as capacitive or resistive sensing, force-sensitive resistors, or optical switches, for example. In an embodiment, the sensor 150 may be part of a touch pad. In an embodiment, the sensor 150 may be part of a touch screen that overlays a display 160 configured to output and display information to the user. In an embodiment, the sensor 150 and the display 160 may be combined into a touch screen device.

The input/output devices 110 may include an audio output device (not shown), such as a speaker, that is configured to provide audio feedback to the user. In an embodiment, the input/output devices 110 may include other types of user input devices, such as a button, a rotary knob, or a joystick that may be manipulated by the user in order for the user to provide input to the system 100. Buttons, rotary knobs and joysticks are currently used, for example, as user input devices in a variety of gaming peripherals and vehicles and implementations of such devices are known to one of ordinary skill in the art.

The input/output devices 110 also includes a haptic output device 170 configured to provide a haptic effect or feedback to the user as, for example, confirmation that an input was received by the system 100. The haptic output device 170 may include one or more actuators, driving circuitry, and a haptic engine configured to generate driving signals for the actuator(s).

The haptic feedback provided by the haptic output device 170 may be created with any of the methods of creating haptic effects, such as vibration, deformation, kinesthetic sensations, electrostatic or ultrasonic friction, etc. In an embodiment, the haptic output device 170 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric materials, electroactive polymers, such as ionic or electronic based electroactive polymers, shape memory materials, smart hydrogels, a macrocomposite fiber actuator, an electrostatic actuator, an electrotactile actuator, a nanocomposite actuator, a pneumatic-based actuator and/or another type of actuator that provides a physical feedback such as vibrotactile feedback. The haptic output device 170 may include non-mechanical or non-vibratory devices such as those that use electrostatic friction (ESF), ultrasonic friction (USF), or those that induce acoustic radiation pressure with an ultrasonic haptic transducer, or those that use a haptic substrate and a flexible or deformable surface, or those that provide thermal effects, or those that provide projected haptic output such as a puff of air using an air jet, and so on. Multiple haptic output devices 170 may be used to generate different haptic effects, as discussed in further detail below. Embodiments of the haptic output device 170 are discussed in further detail below.

As illustrated in FIG. 1, the memory device 130 may also be interconnected with the controller 120 and to the input/output devices 110 via the bus 140. The memory device 130 may include one or more internally fixed storage units, removable storage units, and/or remotely accessible storage units. The various storage units may include any combination of volatile memory and non-volatile memory. The storage units may be configured to store any combination of information, data, instructions, software code, etc. More particularly, the storage units may include haptic effect profiles, instructions for how the haptic output device 170 is to be driven, or other information for generating haptic effects.

The controller 120 may be a general-purpose or specific-purpose processor or microcontroller for managing or controlling the operations and functions of the system 100. For example, the controller 120 may be specifically designed as an application-specific integrated circuit ("ASIC") to control output signals to the display 160 to provide visual information and to the haptic output device 170 to provide haptic effects. The controller 120 may be configured to determine, based on predefined factors, the type(s) of haptic effect(s) to be generated, the order in which the haptic effects are generated, and the magnitude, frequency, duration, and/or other parameters of the haptic effects. The controller 120 may also be configured to provide streaming commands that can be used to drive the haptic output device 170 for providing a particular haptic effect. In some embodiments, the controller 120 may actually include a plurality of processors, each configured to perform certain functions within the system 100.

Figure 2:
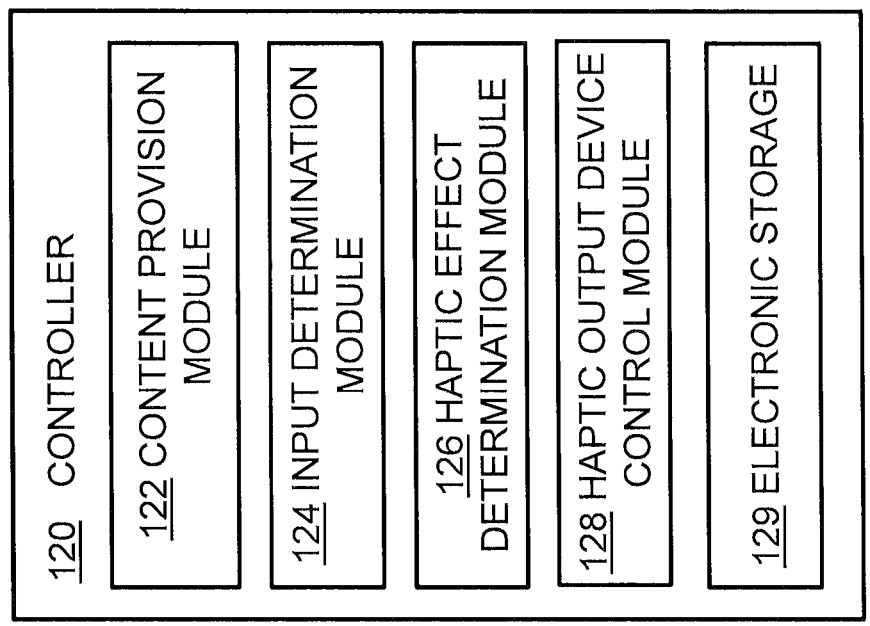
FIG. 2 schematically illustrates an embodiment of a controller of the system of FIG. 1.

FIG. 2 illustrates a more detailed view of an embodiment of the controller 120. The controller 120 may be configured to execute one or more computer program modules. The one or more computer program modules may include one or more of a content provision module 122, an input determination module 124, a haptic effect determination module 126, a haptic output device control module 128, and/or other modules. The controller 120 may be configured to execute the modules 122, 124, 126, and/or 128 by software, hardware, firmware, some combination of software, hardware, and/or firmware, and/or other mechanisms for configuring processing capabilities on the controller 120.

It should be appreciated that although modules 122, 124, 126, and 128 are illustrated in FIG. 2 as being co-located within a single processing unit, in embodiments in which the controller 120 includes multiple processing units, one or more of modules 122, 124, 126, and/or 128 may be located remotely from the other modules. The description of the functionality provided by the different modules 122, 124, 126, and/or 128 described below is for illustrative purposes, and is not intended to be limiting, as any of the modules 122, 124, 126, and/or 128 may provide more or less functionality than is described. For example, one or more of the modules 122, 124, 126, and/or 128 may be eliminated, and some or all of its functionality may be provided by other ones of the modules 122, 124, 126, and/or 128. As another example, the controller 120 may be configured to execute one or more additional modules that may perform some or all of the functionality attributed below to one of the modules 122, 124, 126, and/or 128.

The content provision module 122 is configured to control the provision of content to the user of the system 100 via the display 160. If the content includes computer generated images, the content provision module 122 is configured to generate the images and/or views for display to the user through the display 160. The content, or information from which the content is derived, may be obtained by the content provision module 122 from an electronic storage 129, which may be part of the controller 120, as illustrated in FIG. 2, or may be separate from the controller 120, such as part of the memory device 130 illustrated in FIG. 1.

The input determination module 124 is configured to receive an input signal from the sensor 150. The input signal is generated when the sensor 150 detects an input from a user of the system 100. The input determination module 124 may be configured to determine whether the sensed input is an intentional input or merely an inadvertent touch to the sensor 150 by comparing the strength of the input signal to a predetermined threshold strength that corresponds to an intentional input. The input determination module 124 is also configured to determine what was intended by the user when providing an input to the sensor 150. For example, the user may touch a certain location of the sensor 150 or provide a particular gesture to the sensor 150 that indicates that a certain function is to be performed by the system 100. The input determination module 124 may be programmed with a library of predetermined gestures and touch locations on the sensor 150 so that when the user touches a particular location on the sensor 150 or provides a gesture to the sensor 150, the input determination module 124 may determine a corresponding output.

For example, in an embodiment in which the system 100 is in the form of a smartphone, the user may draw a symbol on the sensor 150 with his or her finger and the input determination module 124 may determine that the drawn symbol corresponds to a particular command, such as unlocking the smartphone so that the user may freely interact with the smartphone. In an embodiment, the input determination module 124 may be configured to receive a signal from a remote device, such as a timer, that provides an input to indicate that a haptic effect is to be generated, instead of or in addition to the signal received from the sensor 150. In addition, the input determination module 124 may also output a signal to the haptic effect determination module 126 and/or the haptic output device control module 128 so that a haptic effect verifying the input has been detected and/or accepted may be provided to the user.

The haptic effect determination module 126 is configured to determine the haptic effect or sensation to be generated by the haptic output device 170 and output to the user of the system 100. Determining the haptic effect may include determining the type of haptic effect and one or more parameters of the haptic effect, such as amplitude, frequency, duration, etc.

The haptic output device control module 128 is configured to control the haptic output device 170 to generate the haptic effect determined by haptic effect determination module 126. This includes communicating a haptic output signal generated by the controller 120 to the haptic output device 170 via the bus 140. In an embodiment, at least a portion of the functionality attributed to the haptic output device control module 128 may be disposed in a controller or processor carried by the haptic output device 170.

Figure 3:
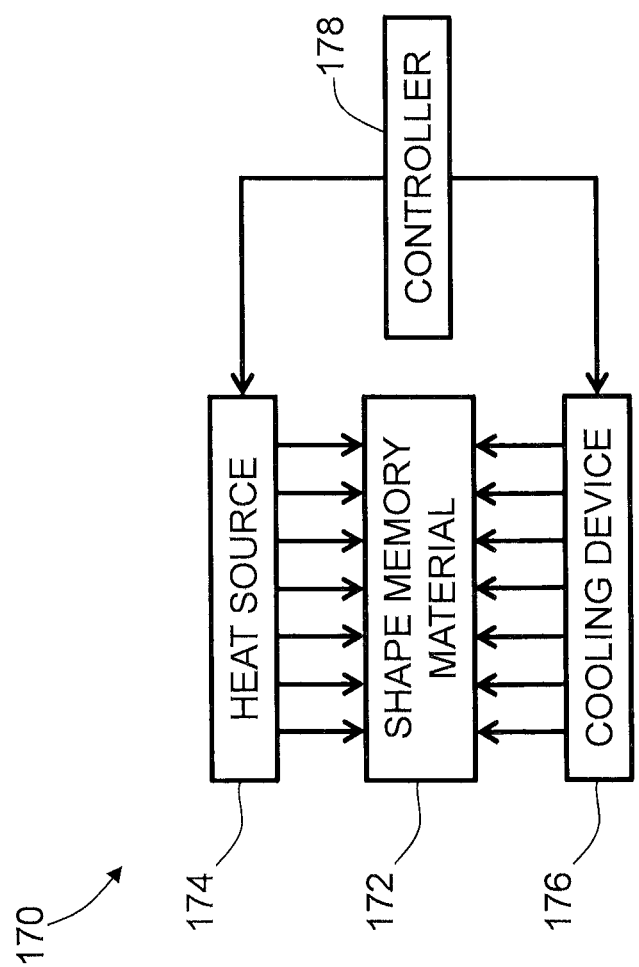
FIG. 3 schematically illustrates an embodiment of a haptic output device of the system of FIG. 1.

FIG. 3 illustrates an embodiment of the haptic output device 170 of FIG. 1. As illustrated, the haptic output device 170 includes a shape memory material ("SMM") 172, such as a shape memory (metal) alloy ("SMA"), a shape memory polymer ("SMP") or a composite thereof, which is configured to quickly generate a significant amount of force as it deforms when heated.

In one embodiment, a combination of SMMs can be programmed differently and used for a better response time and more flexibility in deformation. For example, a first SMM can be programmed in a way that it contracts when heated and a second SMM can be programmed to be straightened when heated. The second SMM can be activated when the first SMM is heated. Then, the second SMM can be heated to facilitate the returning mechanism from the deformed position.

In one embodiment, the SMMs can be a combination of a SMP and SMA in a hybrid structure. In other words, SMA is embedded in a SMP to make a reversible SMM actuator. The SMA could be programmed in a way that it can bring the SMP to the original state. Consequently, the response is accelerated using an external cooler.

The shape memory material 172 may have a form factor of a wire, a plurality of wires, a rod, a thin sheet, a thin film, a fiber, a plurality of fibers, etc. In an embodiment, the shape memory material 172 may be an artificial muscle fiber configured to contract along a longitudinal axis thereof when heated. In an embodiment, the shape memory material 172 may be exposed to stress and deformed to a default state in such a manner that strain is stored in the material. When heat is applied to the shape memory material 172, the shape memory material 172 will release the stored strain and quickly deform back to its original shape, while generating a deformation-based haptic effect. The haptic output device 170 should be configured to generate an initiation force for a fast deformation (e.g. snap buckling) and also be able to remain in a deformed state without consuming energy.

The haptic output device 170 also includes a heat source 174, which may be, for example, an electric heater that generates heat, an electric field generator that generates heat, a magnetic field generator that generates heat, a light source that generates heat or a chemical that causes a reaction that generates heat. In an embodiment, the electric heater may be in the form of a power source that is directly connected to the shape memory material 172 and allows current to flow to the shape memory material 172, which heats the shape memory material 172, as known in the art. When the shape memory material 172 is exposed to heat, the material deforms to its default state to relieve the stain that was generated and stored when the shape memory material 172 was deformed in the first instance.

As illustrated in FIG. 3, the haptic output device 170 also includes a cooling device, or cooler, 176 configured to cool the shape memory material 172 so that the shape memory material 172 can return to its default state. The cooling device 176 is desirably an ultra-thin cooling device that is configured to fit in small electronic devices, such as smartphones and wearable electronic devices.

A controller 178, which may be the same controller 120 described above or may be a separate controller that has substantially the same functionality, particularly with respect to the haptic effect determination module 126 and the haptic output device control module 128, as the controller 120 described above, is in signal communication with the heat source 174 and the cooling device 176. The controller 178 is programmed to control the actuation of the shape memory material 172 by sending a signal to the heat source 174 to generate heat so that the shape memory material 172 will quickly deform and generate a deformation-based haptic effect. The controller 178 is also configured to send a signal to the cooling device 176 when it is time to cool the shape memory material 172 so that the shape memory material 172 returns to its initial configuration in the haptic output device 170. In an embodiment, the cooling device 176 is also configured to generate a vibration-based haptic effect as it cools the shape memory material 172, as described in further detail below.

Figure 4:
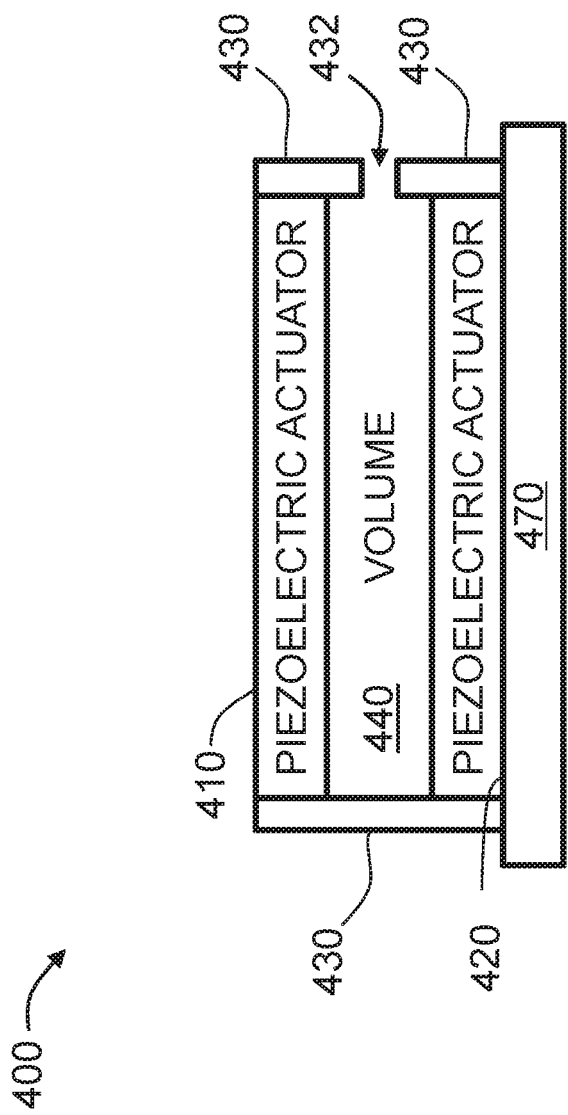
FIG. 4 schematically illustrates an embodiment of a cooling device of the haptic output device of FIG. 3.

FIG. 4 illustrates a cooling device 400 in accordance with an embodiment of the invention. As illustrated, the cooling device 400, which may be referred to as a piezoelectric jet, includes two parallel piezoelectric actuators 410, 420 that are held by a frame 430 and define a volume 440 there between. When the piezoelectric actuators 410, 420 are actuated by a power source and move towards each other, the piezoelectric actuators 410, 420 may be used to push air located in the volume 440 in between the actuators 410, 420 through one or more openings 432 in a sidewall of the frame 430 and towards the shape memory material to cool the shape memory material. Although only one opening is illustrated in FIG. 4, additional openings may be provided in the side wall that runs perpendicular to the page. Additional details of an embodiment of the cooling device may be found in the article "Evaluation and Opportunities for Use of Thin Form Factor Synthetic Jets to Low Profile Electronics Cooling Applications," by Peter de Bock, et al., and published by Electronics Cooling on Dec. 18, 2012 at http://www.electronics-cooling.com/2012/12/evaluation-and-opportunities-for-use-of-thin-form-factor-synthetic-jets-to-low-profile-electronics-cooling-applications-2/, which is incorporated herein by reference in its entirety.

When the polarities of the voltages applied to the piezoelectric actuators 410, 420 are reversed so that the piezoelectric actuators 410, 420 move away from each other, air may be drawn back into the volume 440. By cycling the polarities of the voltages applied to the piezoelectric actuators 410, 420, the cooling device 400 may also function like a pump and provide cool air to the shape memory material to cool the shape memory material. In addition to functioning as a pump, the piezoelectric actuators 410, 420 may create a second haptic effect in the form of vibrations when voltages are applied to the piezoelectric actuators 410, 420 and cause the piezoelectric actuators 410, 420 to move.

The piezoelectric actuators 410, 412 may each include a piezoceramic material and a metal substrate, as known in the art. In an embodiment, other piezoelectric materials, such as piezopolymers (such as copolymer and terpolymer polyvinylidene fluoride ("PVDF")), may be used. Piezopolymers may provide higher strokes than that of piezoceramics and therefore a higher air flow rate/jet of air may be generated by the cooling device 400. In addition, polymeric based piezoelectric materials are more flexible than piezoceramic based piezoelectric materials, and therefore may provide opportunities for more complicated designs, such as curvature. In an embodiment, a bistable material or compliant design may be used as the substrate, not only to improve the amount of air flow/jet of air, but also to create a low power cooling device.

Figure 5:
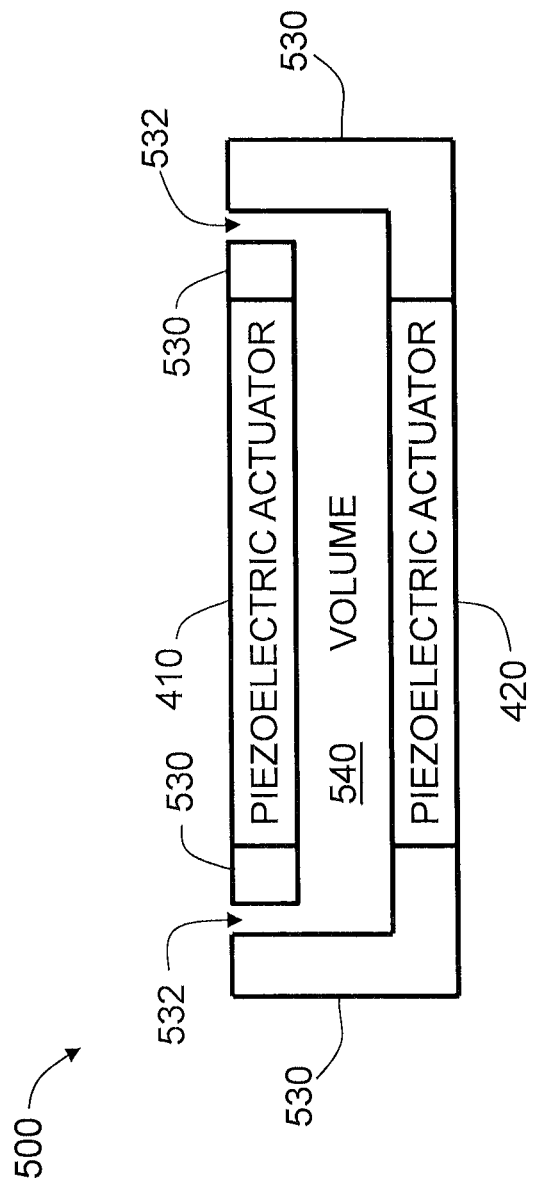
FIG. 5 schematically illustrates an embodiment of a cooling device of the haptic output device of FIG. 3.

FIG. 5 illustrates a cooling device 500 in accordance with an embodiment of the invention. As illustrated, the cooling device 500 includes the two parallel piezoelectric actuators 410, 420 described above that are held by a frame 530 and define a volume 540 there between. The frame 530 differs from the frame 430 illustrated in FIG. 4 in that the frame 530 has a plurality of openings 532 in an upper portion of the frame 530 that supports the upper piezoelectric actuator 410, as illustrated. Otherwise, the functionality of the cooling device 500 illustrated in FIG. 5 is the same as the functionality of the cooling device 400 illustrated in FIG. 4. In an embodiment, the piezoelectric actuators 410, 420 may be disc-shaped and the plurality of openings 532 may surround the piezoelectric actuator 410.

In an embodiment, the cooling device 176 of the haptic output device 170 may be an ionic cooling device (not illustrated), which includes a corona discharge system having a sharp electrode and a blunt electrode. The blunt electrode is configured to collect electrons and may be made of a gold substrate that can be coated on any substrate using deposition techniques. The sharp electrode may be any metal, such as steel in a wire shape, which is typically referred to as a corona wire. The sharp electrode may be strung between ceramic materials for an improved corona discharge. Applying a high voltage potential may create a corona discharge with current in the nano/micro ampere to ampere range. In an embodiment, a single power supply (AC/DC) may be used to activate the sharp electric and the blunt electrode to create air flow due to ion mobility. In embodiments of the invention, other types of cooling devices, such as a thermoelectric-based cooling device (such as a Peltier cooler) may be used. The above-described embodiments should not be considered to be limiting in any way. In an embodiment, a single power supply (AC/DC) may be used to activate the cooling device 176, which may include the piezoelectric actuators 410, 420 or the corona discharge system, and the shape memory material 172.

Figure 6:
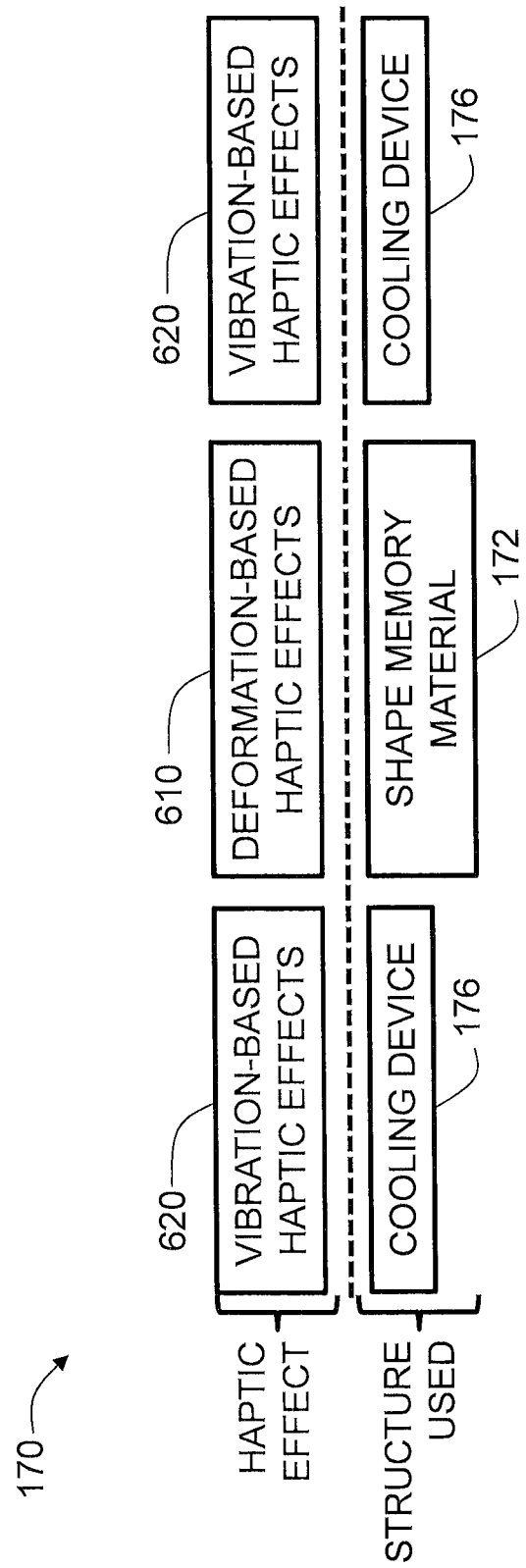
FIG. 6 schematically illustrates an embodiment of the haptic output device of FIG. 3, and haptic effects generated by components of the haptic output device.

As illustrated in FIG. 6, in an embodiment, the haptic output device 170 may provide both deformation-based haptic effects 610, which are generated by the shape memory material 172, and vibration-based haptic effects 620, which are generated by the cooling device(s) 176. Based on the desired deformation and vibration specifications (bending, acceleration, force, etc.), suitable materials may be selected. For example, a shape memory alloy may be used for the shape memory material 172, and a piezoelectric jet, such as the piezoelectric jet illustrated in FIG. 4, may be used for the cooling device 176. The components may be packaged into a single casing made from a flexible frame, which may be fabricated from plastic or metal. The piezoelectric jet may be mounted on a suspension 470 to deliver uniform and higher acceleration throughout the surface of the cooling device. In an embodiment, the shape memory alloy may be positioned well within the volume of the cooling device for better heat transfer. A shape memory alloy wire may be activated by applying an electric field which will heat the wire quickly. In order to return to its initial, equilibrium or default state, dual piezoelectric jets may be activated by applying a voltage of, for example, about 20-1500 Volts, depending on the type of material, to cool the shape memory alloy.

Using the sensor 150 of the system 100 described above, a user input can be detected, and both deformation-based and vibration-based haptic effects can be generated to provide an overall haptic effect to the user, as determined by the controller 120 or the controller 178 as described above. The dual piezoelectric actuator device may be considered to be bi-functional in that it cools the smart memory alloy and generates vibration-based haptic feedback.

Figure 7:
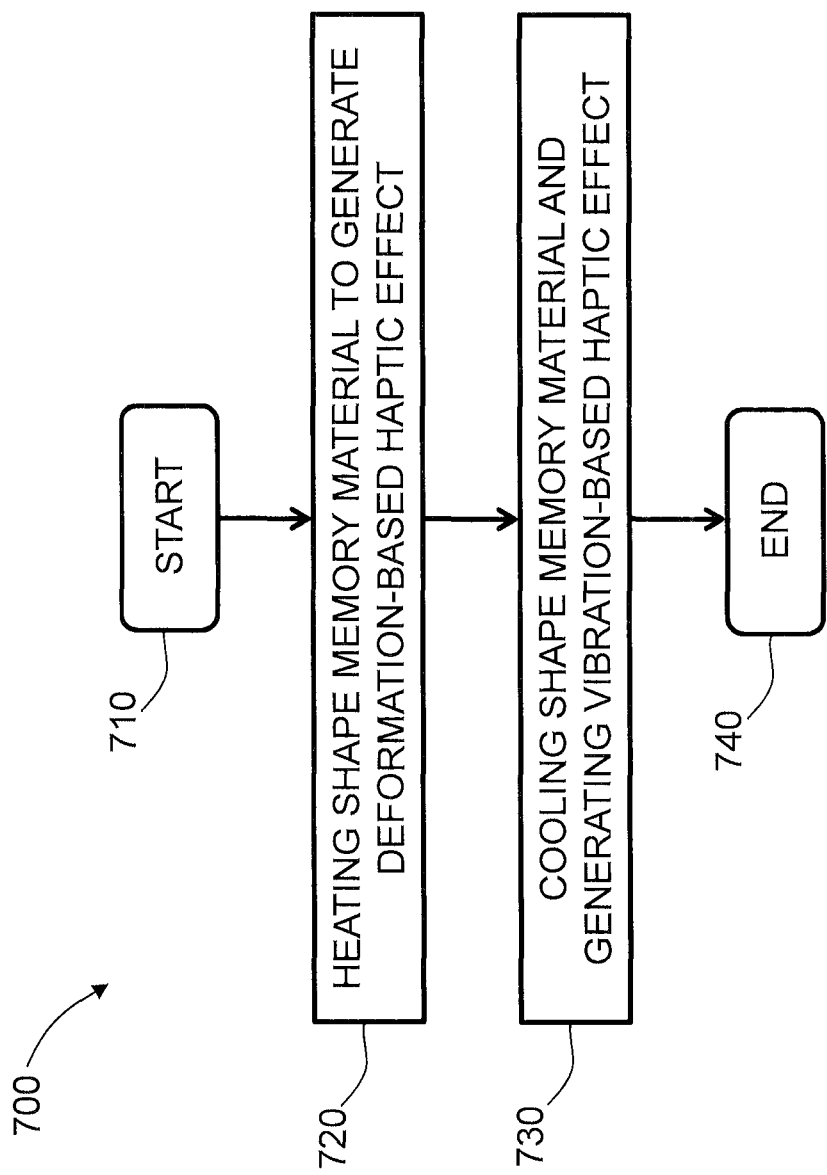
FIG. 7 schematically illustrates a method for providing an overall haptic effect in accordance with embodiments of the invention.

FIG. 7 illustrates a method 700 for providing an overall haptic effect in accordance with embodiments of the invention. The method starts at 710. At 720, a shape memory material is heating to generate a deformation-based haptic effect. The shape memory material may be any of the shape memory materials described above. At 730, the shape memory material is cooled with a cooling device. The cooling device may be any of the cooling devices described above. Also at 730, a vibration-based haptic effect is generated by the cooling device. The method ends at 740.

In an embodiment, the method 700 may also include sensing an input by a user of a system, such as the system 100 described above, with a sensor, such as the sensor 150 described above, after the start at 710 of the method 700 and prior to heating the shape memory material at 720, In an embodiment, after sensing the input by the user of the system, the method 700 may also include determining an overall haptic effect to be generated based on a first signal output by the sensor, and output a second signal to a haptic output device, such as the haptic output device 170 described above, to generate the deformation-based haptic effect and the vibration-based haptic effect.

In additional embodiments, the thermally activated hepatic device can used for actuation, for example, a PC touchpad, a computer mouse, or a gamepad controller, etc. In other embodiments, the SMAs or SMPs can be used not only to provide deformation haptics but also thermal haptics (heat). Yet in other embodiments, the SMAs or SMPs can be used for active labeling. For example, the SMM can be a separate patch designed in a phone case which is programmed to be displayed as bold letters T or C when the device receives a phone call or text, respectively. The user can be notified by touching or observing those letters.

The embodiments described herein represent a number of possible implementations and examples and are not intended to necessarily limit the present disclosure to any specific embodiments. Various modifications can be made to these embodiments as would be understood by one of ordinary skill in the art. Any such modifications are intended to be included within the spirit and scope of the present disclosure and protected by the following claims.

What is claimed is:

1. A haptic output device configured to generate an overall haptic effect, the haptic output device comprising:
    a shape memory material configured to change a shape thereof when heated and generate a deformation-based haptic effect; and
    a cooling device configured to provide cooling air to cool the shape memory material via vibrations in the cooling device and to generate a vibration-based haptic effect via the vibrations in the cooling device, the cooling device being mounted on a suspension;
    wherein the haptic output device is configured to generate the overall haptic effect including both the deformation-based haptic effect and the vibration-based haptic effect in response to a signal from a controller.

2. The haptic output device according to claim 1, wherein the shape memory material comprises a shape memory alloy.

3. The haptic output device according to claim 1, wherein the shape memory material comprises a shape memory polymer.

4. The haptic output device according to claim 1, wherein the cooling device comprises:
    a frame,
    a first piezoelectric actuator supported by the frame, and
    a second piezoelectric actuator supported by the frame, and spaced from and in parallel relation to the first piezoelectric actuator,
    wherein the frame, the first piezoelectric actuator, and the second piezoelectric actuator define a volume, and the frame comprises at least one opening configured to allow the cooling air to flow out of the volume toward the shape memory material to cool the shape memory material.

5. A system comprising:
    a sensor configured to sense an input of a user of the system;
    a controller configured to
        determine an overall haptic effect including a deformation-based haptic effect and a vibration-based haptic effect based on the input sensed by the sensor, and
        output a signal configured to cause the overall haptic effect;
    a haptic output device configured to generate the overall haptic effect including the deformation-based haptic effect and the vibration-based haptic effect in response to the signal output by the controller, the haptic output device comprising
        a shape memory material configured to change a shape thereof when heated and generate the deformation-based haptic effect, and
        a cooling device configured to provide cooling air to cool the shape memory material via vibrations in the cooling device and to generate a vibration-based haptic effect via the vibrations in the cooling device, the cooling device being mounted on a suspension.

6. The system according to claim 5, wherein the shape memory material comprises a shape memory alloy.

7. The system according to claim 5, wherein the shape memory material comprises a shape memory polymer.

8. The system according to claim 5, wherein the cooling device comprises:
    a frame,
    a first piezoelectric actuator supported by the frame, and
    a second piezoelectric actuator supported by the frame, and spaced from and in parallel relation to the first piezoelectric actuator,
    wherein the frame, the first piezoelectric actuator, and the second piezoelectric actuator define a volume, and the frame comprises at least one opening configured to allow the cooling air to flow out of the volume toward the shape memory material to cool the shape memory material.

9. The system according to claim 5, wherein the signal is a second signal and wherein the controller is further configured to receive a first signal from the sensor, determine the overall haptic effect to be generated based on the first signal, and output the second signal to the haptic output device to generate the deformation-based haptic effect and the vibration-based haptic effect.

10. A method for providing an overall haptic effect, the method comprising:
    determining, by a controller, an overall haptic effect including a deformation-based haptic effect and a vibration-based haptic effect;
    outputting a signal configured to cause the overall haptic effect; and
    in response to the signal, causing the overall haptic effect by
        heating a shape memory material to generate a deformation-based haptic effect, and
        cooling the shape memory material by providing cooling air via vibrations in a cooling device and generating a vibration-based haptic effect via the vibrations in the cooling device, the cooling device being mounted on a suspension.

11. The method according to claim 10, wherein the signal is a second signal, the method further comprising:

sensing, with a sensor, an input by a user of a system;
determining the overall haptic effect to be generated based on a first signal output by the sensor; and
outputting a second signal to haptic output device of the system to generate the deformation-based haptic effect and the vibration-based haptic effect.

* * * * *